United States Patent [19]
Kemner et al.

[11] Patent Number: 5,913,914
[45] Date of Patent: Jun. 22, 1999

[54] METHOD AND APPARATUS FOR MANAGING SIMULTANEOUS ACCESS TO A RESOURCE BY A FLEET OF MOBILE MACHINES

[75] Inventors: Carl A. Kemner, Peoria Heights; Craig L. Koehrsen, Peoria, both of Ill.

[73] Assignee: Caterpillar Inc., Peoria, Ill.

[21] Appl. No.: 08/769,295

[22] Filed: Dec. 18, 1996

[51] Int. Cl.$^6$ .................................................. G06F 165/00
[52] U.S. Cl. ............................................. 701/50; 701/117
[58] Field of Search ................................ 701/50, 117, 24; 340/990, 991, 992

[56] References Cited

U.S. PATENT DOCUMENTS

| | | | |
|---|---|---|---|
| 4,839,835 | 6/1989 | Hagenbuch | 701/50 |
| 4,950,118 | 8/1990 | Mueller et al. | 414/274 |
| 5,390,125 | 2/1995 | Sennott et al. | 364/449 |
| 5,445,347 | 8/1995 | Ng | 246/169 |
| 5,586,030 | 12/1996 | Kemner et al. | 364/424.027 |

Primary Examiner—Michael Zanelli
Attorney, Agent, or Firm—W. Bryan McPherson

[57] ABSTRACT

The invention is a system and method for managing a resource having a dump location. A plurality of stop points are located adjacent to the dump location. Each of a plurality of mobile machines includes a queue manager adapted to generate a queue position request signal as each mobile machine approaches the resource. A resource manager is adapted to establish and control a queue to control access to the resource in response to receiving a queue position request signal. The resource manager is also adapted to enable simultaneous access of the dump location by the mobile machines.

26 Claims, 4 Drawing Sheets

METHOD AND APPARATUS FOR MANAGING SIMULTANEOUS ACCESS TO A RESOURCE BY A FLEET OF MOBILE MACHINES

TECHNICAL FIELD

This invention relates generally to a system and method for managing a resource in a mobile machine system and, more particularly, to a system and method for managing simultaneous access to a resource having a dump location with multiple stop points.

BACKGROUND ART

Caterpillar Inc. of Peoria, Ill., manufactures off-road mining mobile machines. For example, the Caterpillar 777C is an off-road mining truck. In commonly owned U.S. Pat. No. 5,390,125, Kyrtsos et al disclose an autonomous mobile machine system for use with a mining mobile machine such as a 777C truck. Such an autonomous mobile machine system may be used, for example, to implement an autonomous mining operation. For example, a plurality of autonomous dump trucks can haul rock from an excavation site to a crusher site in an open pit mining operation.

In addition, in commonly owned U.S. Pat. No. 5,586,030, Kemner et al disclose a system using a queuing technique to manage a single input, fixed position resource such as a wheel loader. However, in a mining system, there are several resources with more complex configurations, such as multiple sided crushers, which are capable of being accessed by multiple mobile machines simultaneously. These resources are difficult to manage because enabling simultaneous access to the resource increases traffic flow throughout the resource.

The present invention is directed to overcoming one or more of the problems as set forth above.

DISCLOSURE OF THE INVENTION

In one aspect of the present invention, a system for managing a resource shared by a plurality of mobile machines is provided. The resource includes a dump location located within the resource. The dump location has a plurality of stop points located adjacent to it. The system includes a queue manager on each mobile machine adapted to generate a queue position request signal in response to one of the mobile machines approaching the resource. The system also includes a resource manager adapted to establish and control access to the resource in response to receiving the queue position request signal. The resource manager also enables simultaneous access of the dump location by the mobile machines.

In another aspect of the present invention, a method for managing a resource shared by a plurality of mobile machine is provided. The resource has a dump location within it. The dump location has a plurality of stop points located adjacent to it. The method includes the steps of establishing and controlling a queue to control access to the resource, and enabling simultaneous access to the dump location by the mobile machines.

BEST MODE FOR CARRYING OUT THE INVENTION

Figure 1:
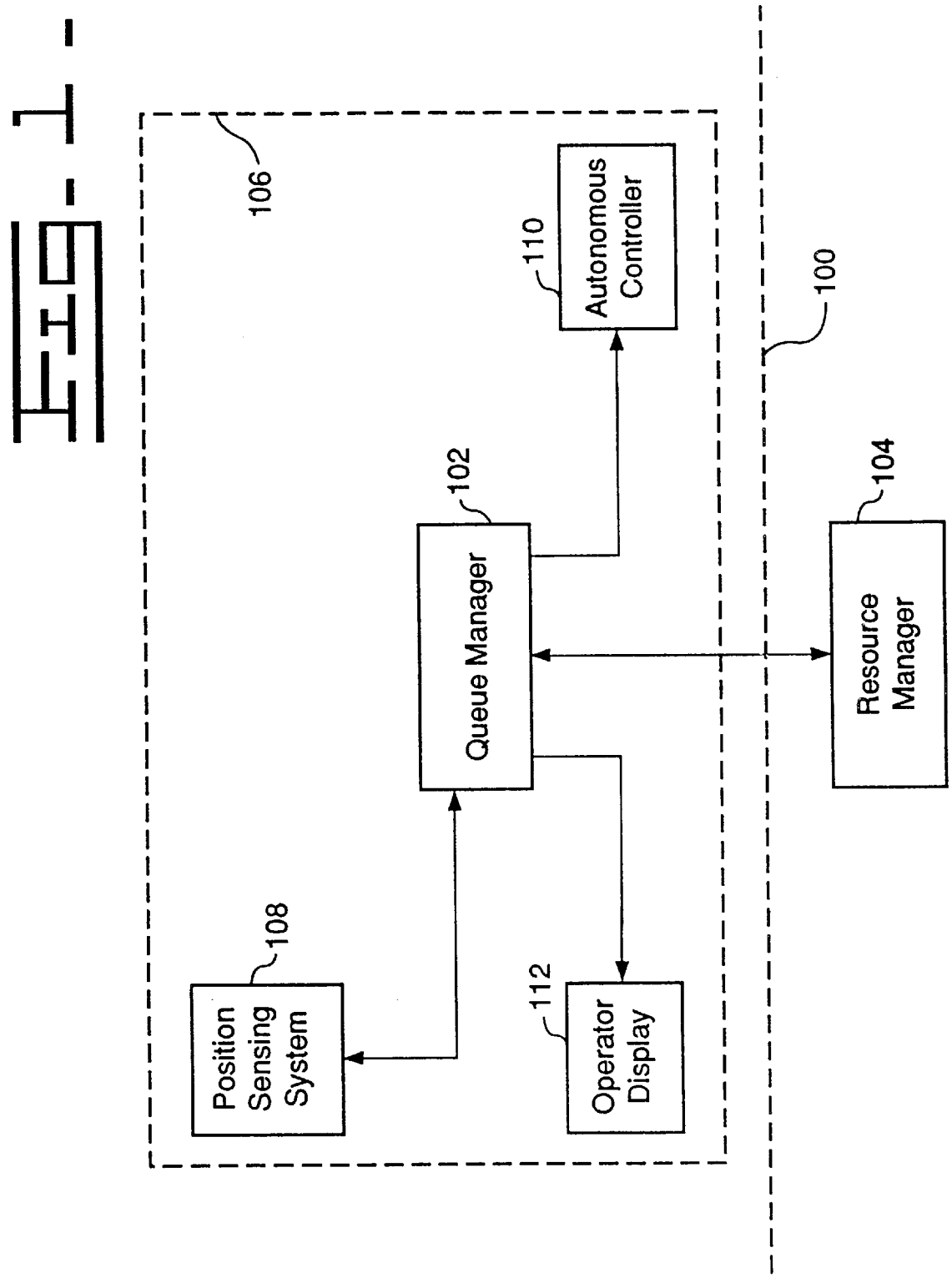
FIG. 1 is a high level block diagram illustrating an embodiment of the present invention.
Figure 2:
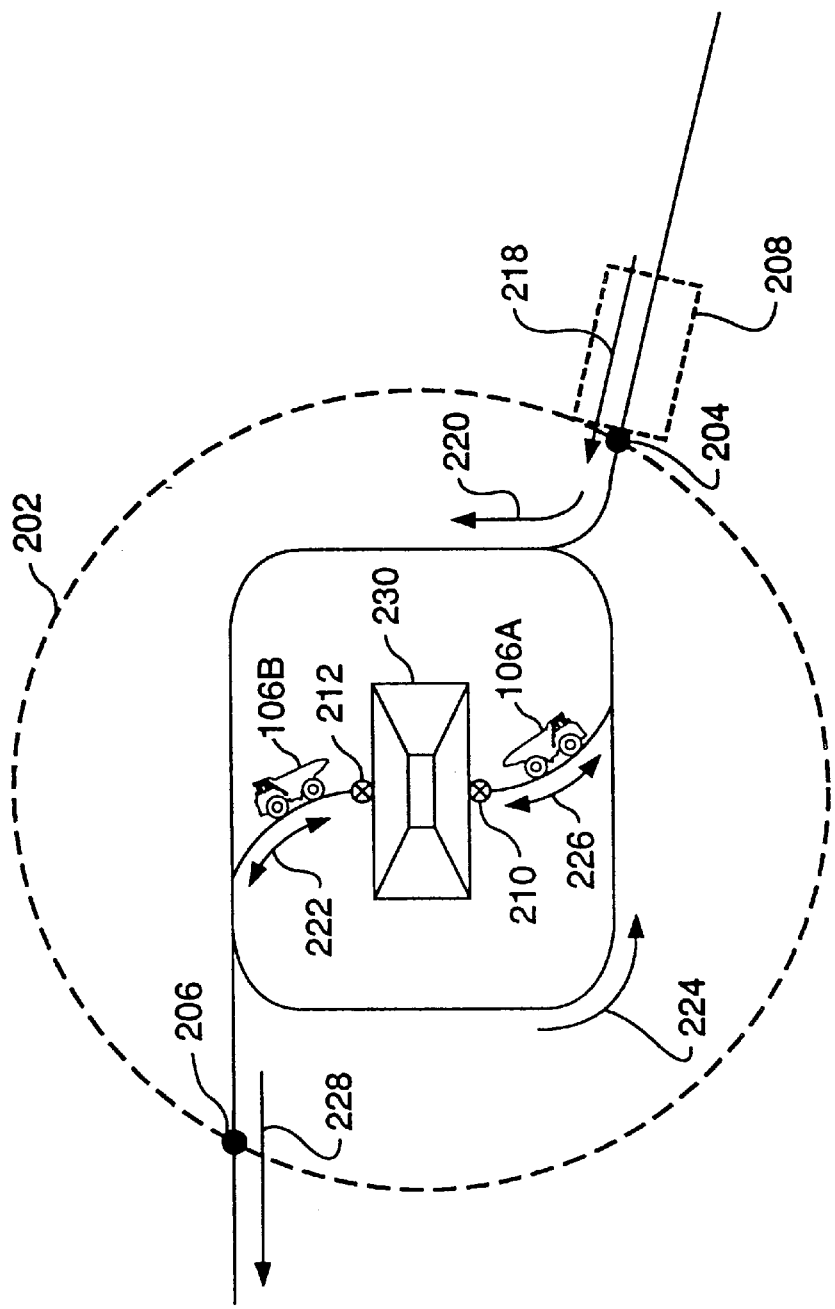
FIG. 2 is a diagrammatic illustration of a resource having one entry point, one exit point, one dump location, and two stop points.

With reference to FIGS. 1 and 2, the present invention provides a system 100 for managing a resource 202 shared by a plurality of mobile machines. The resource 202 includes at least one dump location 230, and a plurality of stop points 210,212 located adjacent to the dump location 230. A resource manager 104 enables multiple mobile machines to simultaneously access the dump location 230. In the preferred embodiment the dump location 230 is a multiple sided crusher.

A queue manager 102 is located on each mobile machine 106. The queue manager 102 generates a queue position request signal when the mobile machine 106 approaches the resource 202.

The resource manager 104 establishes and controls a queue to control access to the resource 202 in response to receiving the queue position request signal for the approaching mobile machine 106. The resource manager 104 enables simultaneous access of the dump location 230 by multiple mobile machines 106A, 106B. Each of the mobile machines 106 accesses one of the stop points 210, 212 respectively.

A position sensing system 108 determines the position of a predetermined point on the mobile machine 106. The position sensing system 108 may include a Global Positioning System (GPS), a laser positioning system, an inertial navigation unit, or any suitable system or combination thereof.

The system 100 may operate in an autonomous or manual mode. In the autonomous system embodiment, an autonomous controller 110 receives signals from the position sensing system 108 and the queue manager 102 and autonomously operates the mobile machine 106 along a predetermined path. In the manual system embodiment, an operator display 112 displays information to assist an operator during operation of the mobile machine 106.

In the preferred embodiment, the resource 202 has a dump location 230 such as a two sided crusher, as illustrated in FIG. 2. The resource manager 104 controls the flow of mobile machines, such as dump trucks, through the resources at a work site such as an open pit mining site. The resource manager 104 acts like a supervisor, controlling access to the resource 202, and tracking the progress of the mobile machines as they pass through the resource 202. In the preferred embodiment, the resource manager 104 is located at a base station (not shown) near an open pit mining site, and is a general purpose computer or workstation. The features of the resource manager 104 are embodied in software programmed into the computer.

With reference to FIG. 2 in the preferred embodiment, the resource 202 includes a dump location 230, such as a multiple sided crusher, and the dump location 230 has multiple stop points 210, 212. The resource 202 has at least one entry point 204 and at least one exit point 206. Arrows 218, 220, 222, 224, 226, 228 indicate the direction of travel of mobile machines through the resource 202.

The resource manager 104 establishes a queue 208 for the entry point 204 to the resource 202. As a mobile machine 106A approaches the resource 202, it requests a position within the queue 208 located at the entry point 204 it is approaching. The resource manager 104 responds with a blocking signal to prevent the mobile machine 106 from accessing the resource 202 and a queue position for the approaching mobile machine 106A.

When the dump location 230 is ready to receive another mobile machine 106, the resource manager selects the mobile machine 106A in the first position of the queue 208 and determines the appropriate stop point 210, 212 to send it to. The resource manager 104 then determines when the route to the stop point 210, 212 is clear. The timing of the access of the dump location 230 is important to ensure that multiple mobile machines do not conflict with each other as they move through the resource 202. The resource manager 104 then sends the mobile machine 106A to the stop point 210. The resource manager 104 is able to send multiple mobile machines to the dump location 230 to simultaneously access the dump location 230. Specifically, a first and second mobile machine 106A, 106B, can be located at separate stop points 210, 212 respectively, and simultaneously dump their material at the dump location 230.

When a mobile machine 106A has completed dumping its material, it will send a signal to the resource manager 104 indicating it has completed its dump. The resource manager 104 will then send a command to the mobile machine 106A to leave the resource 202. The mobile machine 106A will then leave the resource 230 via the exit point 206. Once the mobile machine 106A has left the resource 202, the resource manager 104 selects the next appropriate mobile machine 106 in the queue 208 to allow access to an available stop point 210, 212 at the dump location 230.

Figure 3:
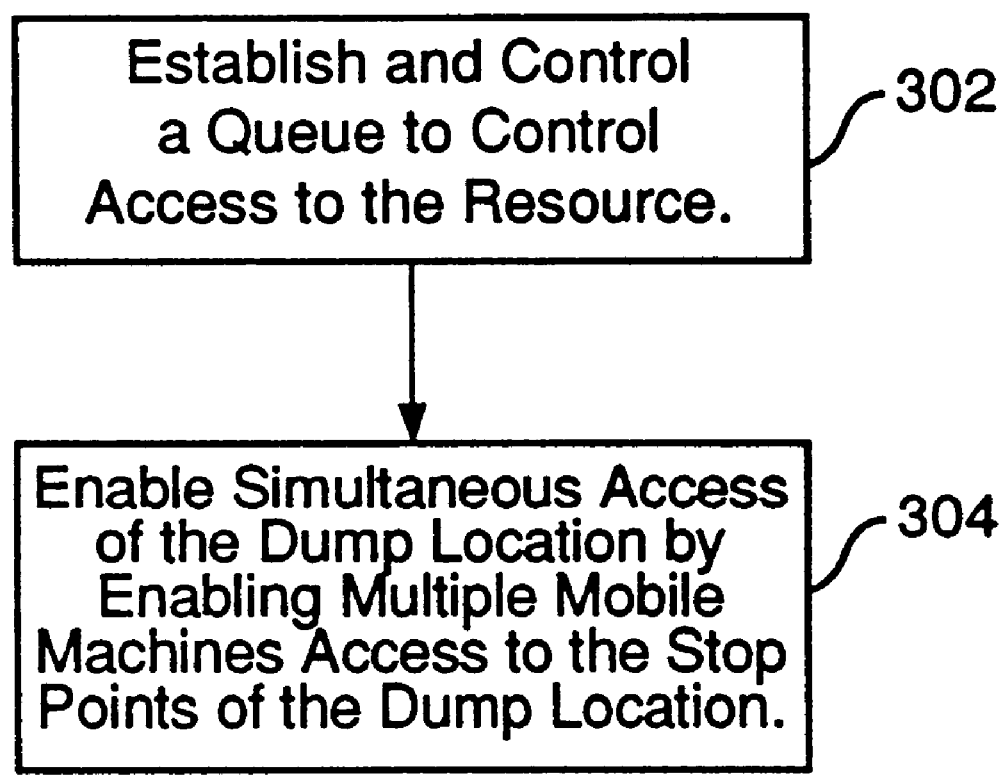
FIG. 3 is a high level flow diagram illustrating a method of the present invention.

A method of managing a resource 202 according to one embodiment of the present invention is illustrated in FIG. 3. In a first control block 302, the resource manager 104 establishes and controls a queue 208, corresponding to the entry point 204, in order to control access to the resource 202. In a second control block 304 the resource manager 104 enables simultaneous access of the dump location by enabling multiple mobile machines 106A, 106B to simultaneously access the stop points 210, 212 adjacent to the dump location 230.

INDUSTRIAL APPLICABILITY

With reference to the drawings and in operation, the present invention provides a system and method for managing access to a resource 202 having a dump location 230, and a plurality of stop points 210, 212 located adjacent to the dump location 230. In the preferred embodiment the dump location 230 is a two sided crusher. In the preferred embodiment, during initialization, the resource manager 104 accesses a database containing the information regarding the configuration of the resource 202. For example, referring again to FIG. 2, the resource manager 104 determines the resource 202 contains one dump location 230, e.g., the two sided crusher, one entry point 204, one exit point 206, and two stop points 210, 212. Based on this information, the resource manager 104 establishes a queue 208 for the entry point 204. As a mobile machine 106A approaches the resource 202, the queue manager 102 sends a queue position request signal to the resource manager 104. The resource manager 104 will determine and send a queue position signal to the mobile machine 106. The queue position signal will contain information concerning the physical location of the first position in the queue 208, e.g., the entry point 204 in the queue 208, and the number of mobile machines currently in the queue 208, e.g., zero. The queue manager 102 on the mobile machine 106A will use the information contained in the queue position signal to determine where to stop the mobile machine 106A to await further instructions from the resource manager 104.

The resource manager 104 then determines when a stop point 210, 212 is available. A stop point 210, 212 is available when a mobile machine 106 that is attempting to access the dump location 230 via a stop point 210, 212, has completed dumping its material at the dump location 230 and has left the stop point 210, 212. The resource manager 104 is able to track the progress of mobile machines in the resource 202 by a series of communications which will be described below.

Once the resource manager 104 determines that a stop point 210, 212 is available, the resource manager 104 checks to make sure the route to the stop point 210, 212 is clear. Once the resource manager 104 determines that the route to the stop point 210 is clear, it sends a depart queue position signal to the mobile machine 106A in the first position of the queue 208. The depart queue position signal contains the location of the stop point 210 that the mobile machine 106A is to access. Upon receiving the depart queue position signal, the mobile machine 106A responsively sends a leave queue position signal to the resource manager 104 and moves to the stop point 210. Once the resource manager 104 receives the leave queue position signal from the mobile machine 106A, it updates the positions of any remaining mobile machines in the queue 208. This may include any different mobile machine being moved from the nth position to the nth minus one position within the queue.

The resource manager 104 may now determine if any other stop points 210, 212 are available for access. In this embodiment, with two stop points 210, 212, the resource manager 104 may send the next mobile machine 106B in the first position of the queue 208 to access the stop point 212 not being accessed by the first mobile machine 106A.

After arriving at the stop point 210 the mobile machine 106A will send an arrive signal to the resource manager 104. When the resource manager 104 receives this signal, it will know the route to the second stop point 212 is clear. When the second stop 212 is available, the resource manager 104 will check to make sure the route is still clear, and then send the mobile machine 106B in the first position of the queue 208 to access the second stop point 212. Due to the nature of the dump location, if the first and second mobile machine 106A, 106B reach their respective stop points 210, 212, at the same time, they may simultaneously access the dump location 230. That is, they may simultaneously dump their material into the two sided crusher.

Once a mobile machine 106A has finished dumping its material at the dump location 230, it sends a dump complete signal to the resource manager 104. The resource manager 104, will check to see if the route from the stop point 210 to the exit point 206 is clear. When the route is clear, the resource manager 104 will send a depart dump point signal to the mobile machine 106A. The depart dump point signal will contain a route to take to exit the resource 202 via the exit point 206. The mobile machine 106A responsively sends a leave stop point signal to the resource manager 104, and then leaves the stop point 210. When the mobile machine 106A exits the resource 202, it sends a leave resource signal to the resource manager 104.

When the resource manager 104 receives the leave stop point signal from the mobile machine 106A, it repeats the process of sending a mobile machine 106 to access the available stop point 210.

The present invention may be used to manage resources having dump locations with more complex configurations.

Figure 4:
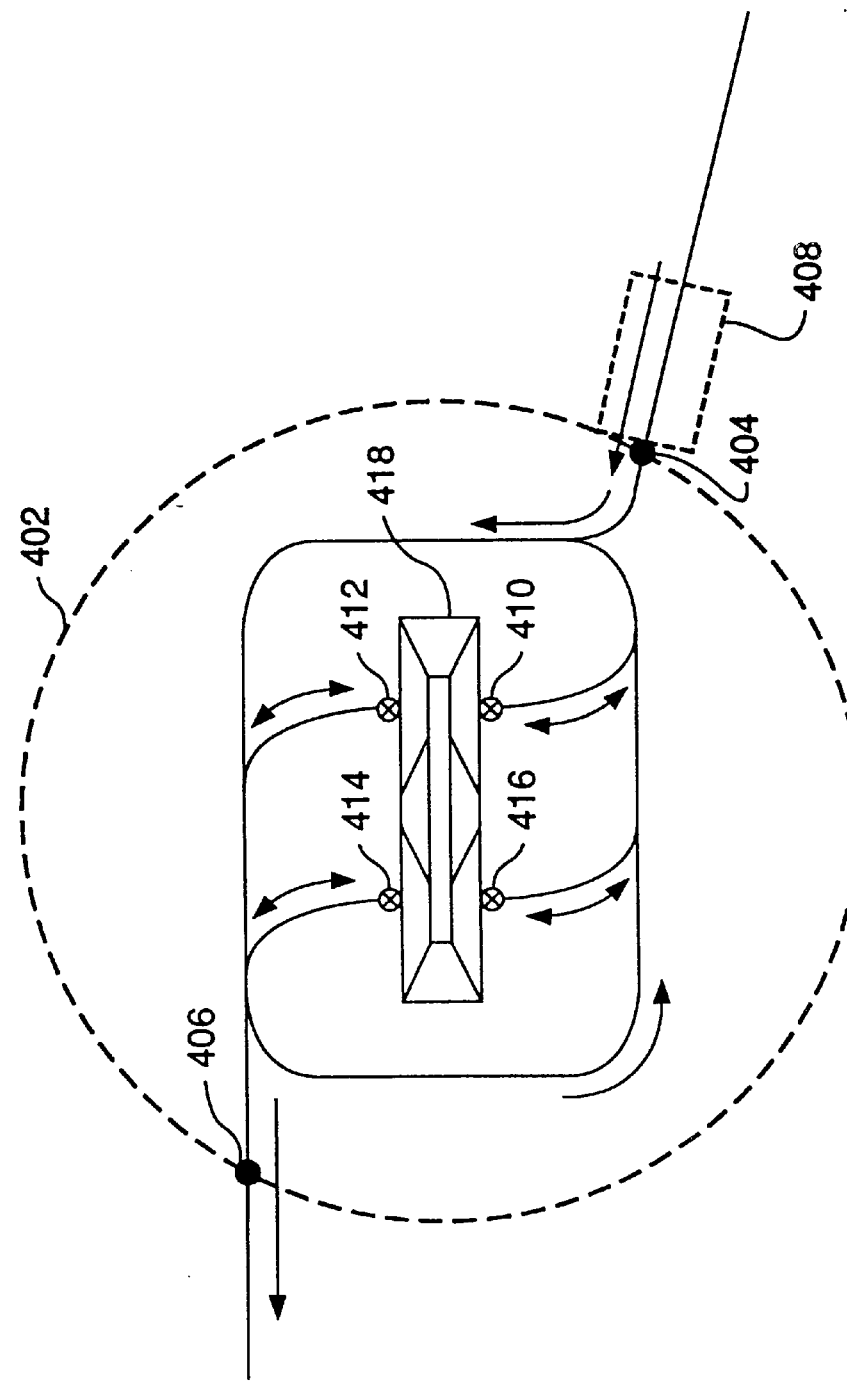
FIG. 4 is a diagrammatic illustration of a resource having one entry point, one exit point, one dump location, and four stop points.

For example, the resource 402 of FIG. 4 has a dump location 418 which has four stop points 410, 412, 414, 416, one entry point 404, one exit point 406, and one queue 408. The configuration of the resource 402 will enable more mobile machines to simultaneously access the dump location 418 via the stop points 410, 412, 414, 416 as long as their routes to and from the stop points 410, 412, 414, 416 do not conflict with each other.

Complex resource configurations may require the resource manager 104 to use a route planner to determine the route to and from the stop points 410, 412, 414, 416.

While the invention has been particularly shown and described with reference to several preferred embodiments thereof, it will be understood by those skilled in the art that various changes in form and details may be made therein without departing from the spirit and scope of the invention.

Other aspects, objects, and features of the present invention can be obtained from a study of the drawings, the disclosure, and the appended claims.

We claim:

1. A system for managing a resource shared by a plurality of mobile machines, comprising:

at least one dump location located within said resource;

a plurality of stop points located adjacent said at least one dump location;

a queue manager located on each mobile machine of said plurality of mobile machines, said queue manager being adapted to generate a queue position request signal in response to said mobile machine approaching said resource; and a resource manager adapted to establish a queue to control access to said resource, and adapted to receive said queue position request signal and responsively determine a queue position in said queue, and enable simultaneous access of said dump location by said plurality of mobile machines, each mobile machine of said plurality of mobile machines accessing a respective one of said plurality of stop points.

2. A system, as set forth in claim 1, wherein said resource manager is adapted to determine a configuration of said resource.

3. A system, as set forth in claim 1, wherein said resource includes at least one entry point, and at least one exit point.

4. A system, as set forth in claim 3, wherein said resource manager is adapted to deliver a queue position signal to said mobile machine approaching said resource, wherein said queue position signal includes data disclosing a position of said entry point and a number of mobile machines in said queue.

5. A system, as set forth in claim 4, wherein said queue manager is adapted to determine said queue position from said position of said entry point and said number of mobile machines in said queue.

6. A system, as set forth in claim 1, wherein said queue manager is adapted to generate a stop point ready signal, and communicate said stop point ready signal to said resource manager.

7. A system, as set forth in claim 1, wherein said dump location is adapted to generate a stop point ready signal, and communicate said stop point ready signal to said resource manager.

8. A system, as set forth in claim 1, wherein said resource manager is adapted to receive a stop point ready signal, said stop point ready signal including data disclosing a position of said stop point.

9. A system, as set forth in claim 1, wherein said queue manager is adapted to generate a dump complete signal and communicate said dump complete signal to said resource manager.

10. A system, as set forth in claim 1, wherein said resource manager is adapted to allow said mobile machine in said first position of said queue to access one of said plurality of stop points in response to a condition of said resource.

11. A system, as set forth in claim 1, wherein said dump location is a crusher.

12. A system, as set forth in claim 1, wherein said resource manager is adapted to selectively deliver a blocking signal to prevent mobile machines in said queue from accessing said resource.

13. A method for managing a resource shared by a plurality of mobile machines, said resource having a dump location located within said resource, said resource having a plurality of stop points located adjacent said dump location, the method including the steps of:

establishing and controlling a queue to control access to said resource; and enabling simultaneous access of said dump location by said plurality of mobile machines, each mobile machine of said plurality of mobile machines accessing a respective one of said plurality of stop points.

14. A method, as set forth in claim 13, including the step of determining a configuration of said resource.

15. A method, as set forth in claim 14, wherein the configuration of said resource includes at least one entry point and at least one exit point.

16. A method, as set forth in claim 13, wherein establishing and controlling said queue includes the step of controlling the placement of said mobile machine in said queue as said mobile machine approaches said queue.

17. A method, as set forth in claim 16, wherein controlling the placement of said mobile machine includes the steps of:

receiving a queue position request signal from said mobile machine;

responsively determining a queue position in said queue; and communicating said queue position to said mobile machine.

18. A method, as set forth in claim 17, wherein communicating said queue position includes the steps of:

communicating data disclosing a position of one of said at least one entry point to said mobile machine as a function of said queue and a determination of the number of mobile machines in said queue; and responsively determining said queue position.

19. A method, as set forth in claim 13, including the step of determining one of said plurality of stop points to access, and responsively communicating said stop point determination to a mobile machine in a first position of said queue.

20. A method, as set forth in claim 19, including the steps of:

determining a route from said queue to said one of said stop points; and communicating said route to said mobile machine in said first position of said queue.

21. A method, as set forth in claim 13, including the step of allowing said mobile machine in said first position of said queue to access one of said stop points in response to a condition of said resource.

22. A method, as set forth in claim 21, including the steps of:

communicating a depart position signal to said mobile machine in said first position of said queue in response to determining to allow said mobile machine to access one of said stop points;

receiving a leave position signal from said mobile machine upon departure of said mobile machine from said first position of said queue; and updating positions of any mobile machines remaining in said queue in response to receiving said leave position signal.

23. A method, as set forth in claim 22, wherein updating positions includes the step of moving a mobile machine in an nth position of said queue to an nth-1 position of said queue.

24. A method, as set forth in claim 22, including the step of receiving an arrive stop point signal from said mobile machine as said mobile machine arrives at said stop point.

25. A method, as set forth in claim 13, including the steps of:

receiving a dump complete signal from said mobile machine in response to completion of dumping;

responsively generating and communicating a depart stop point signal to said mobile machine;

receiving a leave stop point signal from said mobile machine in response to said mobile machine leaving said stop point; and receiving a leave resource signal from said mobile machine in response to said mobile machine leaving said resource.

26. A method, as set forth in claim 25 wherein responsively generating and communicating a depart stop point signal includes the step of determining a route to an exit point.

* * * * *